Sept. 6, 1955 R. VIALL, JR., ET AL 2,716,845
LAWN MOWER SHARPENING MACHINE
Filed July 17, 1951 3 Sheets-Sheet 2
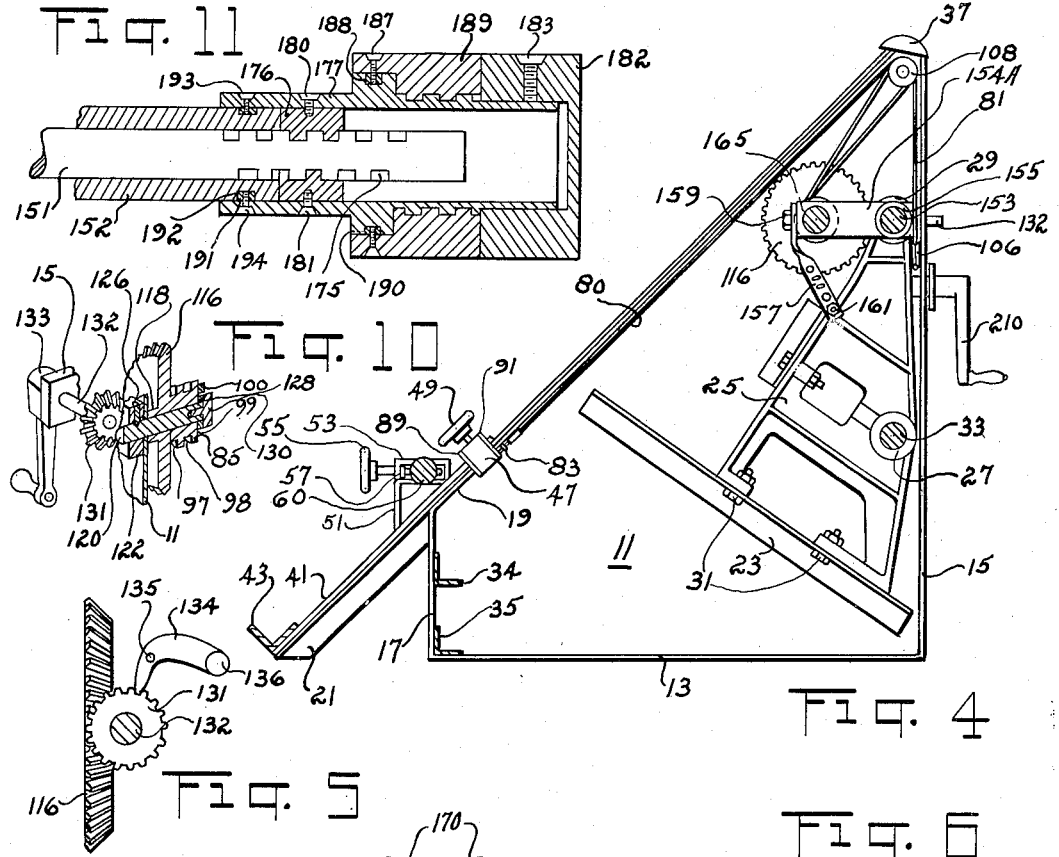
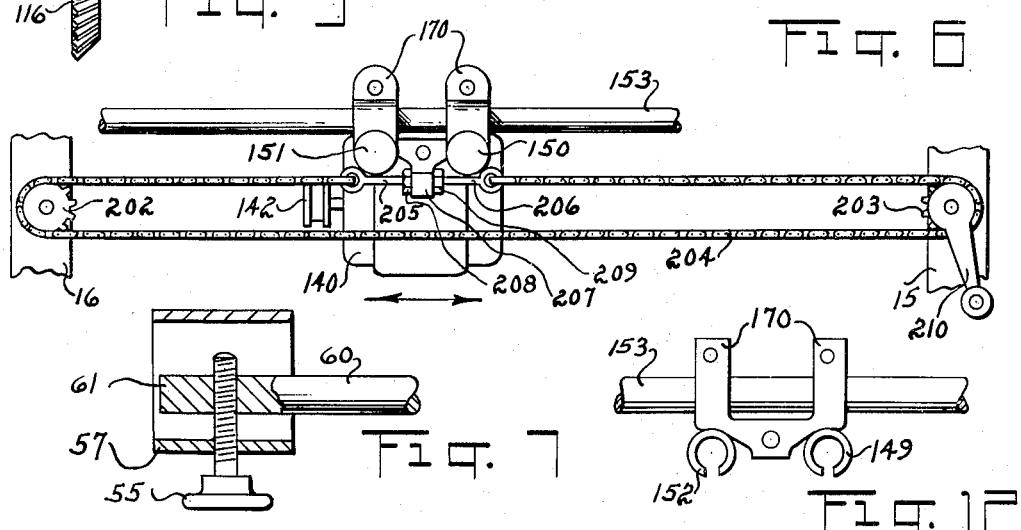
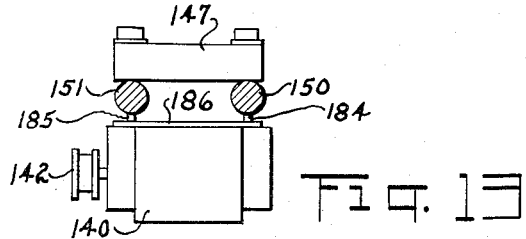
INVENTORS
Richmond Viall, Jr.
Russell I. Peterson, Jr.
BY Roger H. Johnson
William Frederick Warner
Attorney.

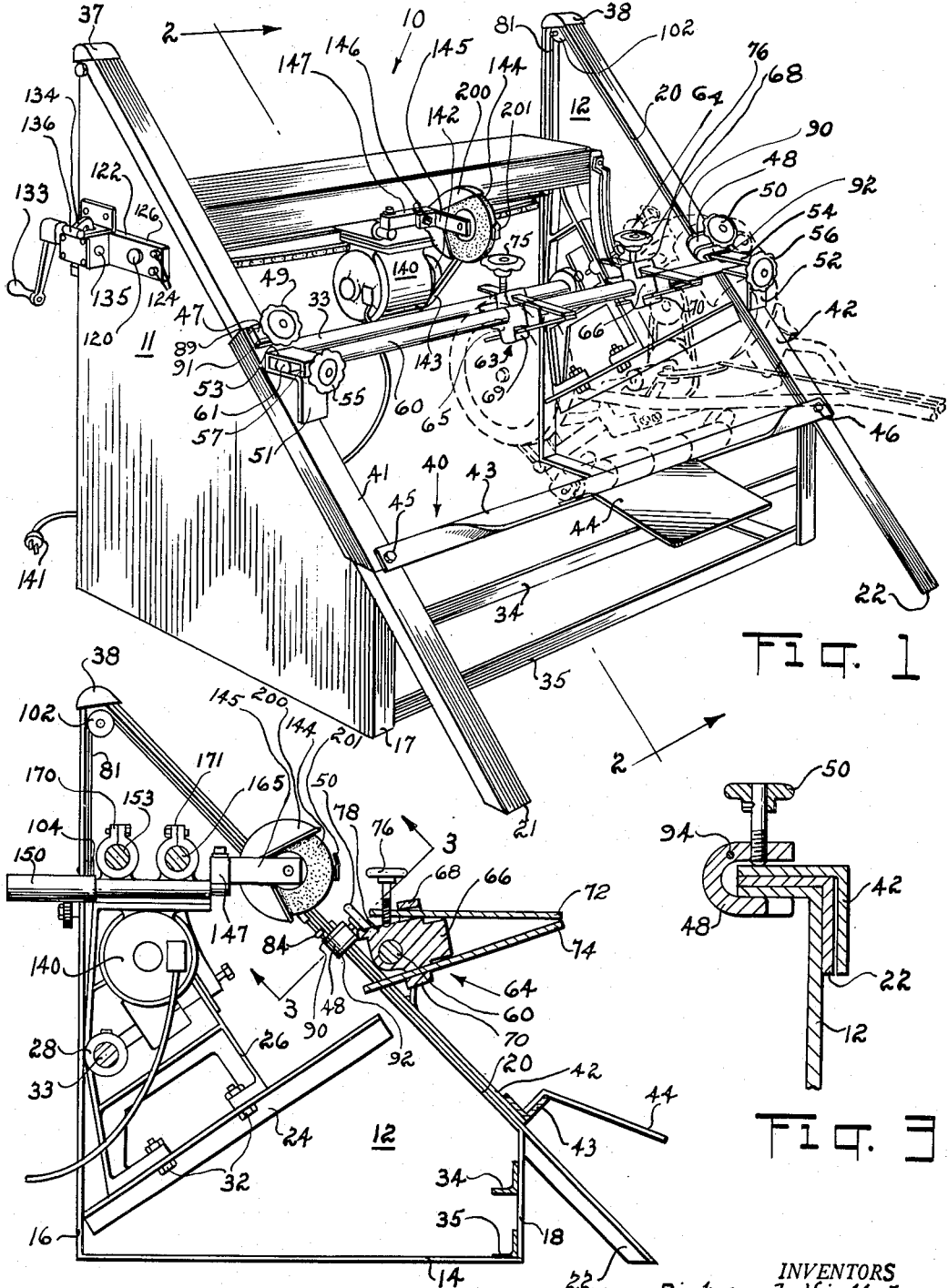

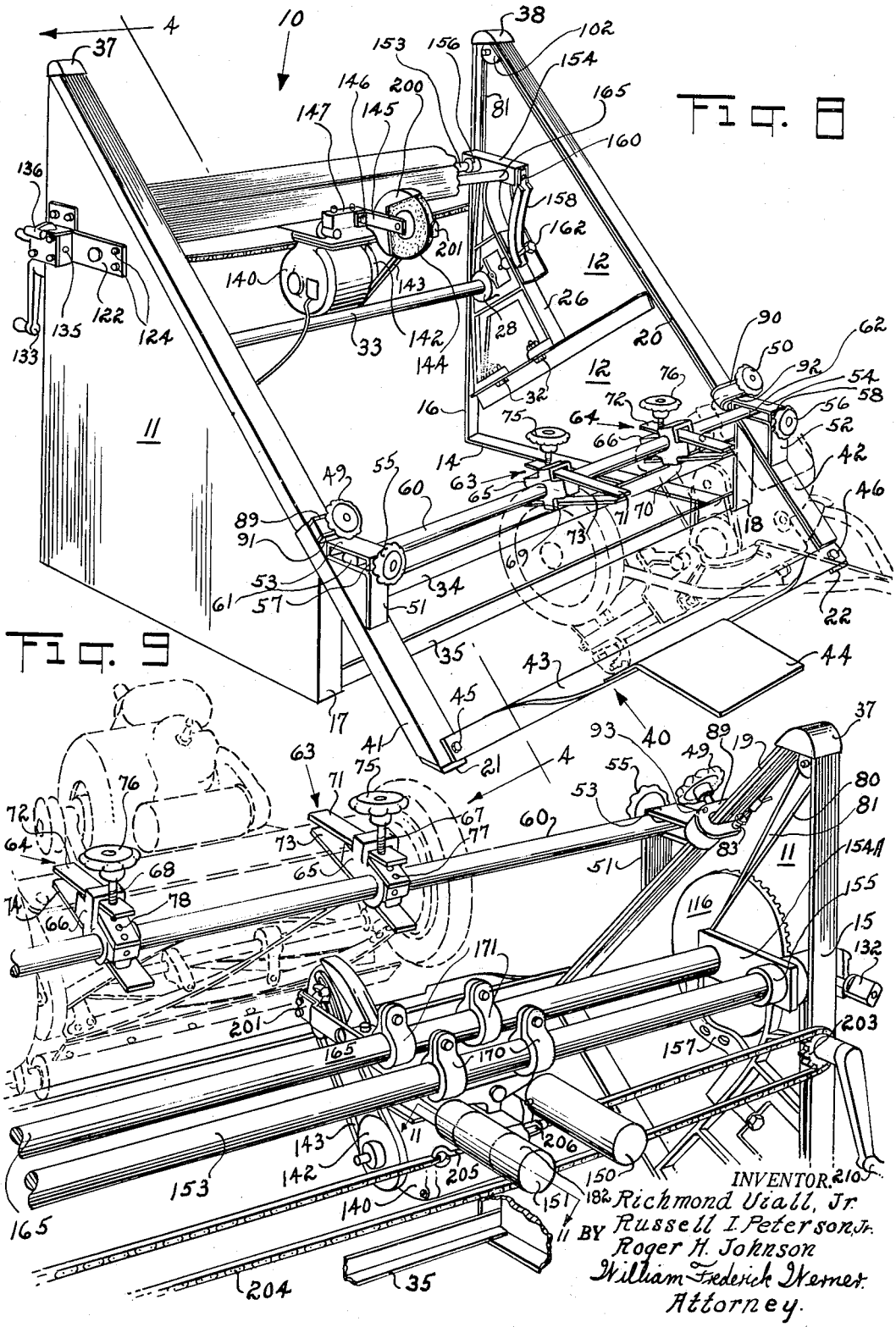

United States Patent Office 2,716,845
Patented Sept. 6, 1955

2,716,845

LAWN MOWER SHARPENING MACHINE

Richmond Viall, Jr., Providence, Russell I. Peterson, Jr., East Providence, and Roger H. Johnson, Davisville, R. I., assignors to The Graham Manufacturing Co., Inc., East Greenwich, R. I., a corporation of Rhode Island Application July 17, 1951, Serial No. 237,132

6 Claims. (Cl. 51—48)

This invention relates to a lawn mower sharpening machine and more particularly to a fixture upon which a power driven lawn mower may be brought into position before the traversing grinding wheel which sharpens the reel blades while they remain in operative condition in the lawn mower.

One of the principal objects of the present invention is to provide a fixture upon which the smallest or the largest, the lightest or the heaviest, hand operated, power driven, tractor or horse drawn gang, lawn mower may be held while the reel blades are sharpened, with a straight edge in their cutting surface, while the blades remain in their operative position in the lawn mower.

Another object of the present invention is to provide a fixture upon which the reel blades of a lawn mower may be sharpened without removing the bed knife from the lawn mower and which may be readily adjusted for varying the depth of the cut by the grinding wheel employed.

Another object of the present invention is to provide a machine wherein the grinding wheel, which is motor driven, is susceptible of adjustment so as to become properly set with relation to the reel blade or reel blades to be sharpened while they remain in the lawn mower and the lawn mower holder is adjustably supported for the proper locating or positioning of the reel blades with relation to the grinding wheel.

A further object of the present invention is to provide a machine which is comparatively simple in its construction, thoroughly reliable and efficient in its purpose, susceptible of adjustment both for the grinding wheel and the reel blades to be sharpened, strong, durable and inexpensive to manufacture.

A still further object of the present invention is to provide a lawn mower sharpening machine which will grind a reel blade uniformly throughout its length while the reel blade remains in the lawn mower.

In the past, a lawn mower sharpening machine required that the lawn mower be turned upside down to enable the grinding wheel to contact the reel blade. This was extremely hazardous for two reasons. Where power driven lawn mowers were involved, gasoline and oil ran or dripped onto the floor creating a fire hazard. Secondly a block and fall was employed to lift the lawn mower into the machine and hold the lawn mower in position while sharpening took place. This required the services of two men even when the sharpening machine did not require the lawn mower to be turned upside down. The present invention obviates these undesirable conditions by eliminating the block and fall, the upside down position of the lawn mower and the services of one man. In addition a safe, simple method of sharpening a lawn mower is employed.

Other objects of the present invention will be apparent in part and be pointed out in part in the accompanying specification and claims.

Like reference characters refer to like parts in the accompanying drawings wherein:

Figure 1 is a perspective view of the new and improved lawn mower sharpening machine.

Figure 2 is a side elevational view partly in section, taken along line 2—2 of Figure 1 looking in the direction of the arrows.

Figure 3 is a sectional view of the clamping means for holding the lawn mower to the machine. It is taken along line 3—3 of Figure 2.

Figure 4 is a side elevational view partly in section taken along line 4—4 of Figure 8 looking in the direction of the arrows.

Figure 5 is a schematic view of the ratchet mechanism employed to prevent the lawn mower holding fixture from slipping downwardly when it is being raised.

Figure 6 is a schematic view showing the bar which holds the grinding wheel motor and the drive which traverses the grinding wheel across the reel blade.

Figure 7 is a schematic view which shows the adjustment on either end of the bar to which the lawn mower is clamped in the fixture.

Figure 8 is a perspective view similar to Figure 1, showing the carriage in loading position.

Figure 9 is a perspective view showing the lawn mower blade in position before the grinding wheel as sharpening takes place.

Figure 10 is a perspective schematic view partly in section showing the mechanism for raising and lowering the lawn mower holding slide.

Fig. 11 is a sectional view, taken along line 11—11 of Figure 9 showing the mechanism for advancing and retracting the grinding wheel to and from the reel blade.

Figure 12 is a schematic view showing the housing for holding the mechanism shown in Figure 11.

Figure 13 is a schematic view showing how the grinding wheel motor is attached to the mechanism shown in Figure 11.

Referring to Figure 1 wherein reference character 10 indicates generally the assembled machine, consisting of a left hand side frame 11 and a right hand side frame 12. The frames 11 and 12 are made of sheet iron with all the edges bent inwardly to form ledges. The ledges of frame 11 are indicated as follows (see Figure 4). Base ledge 13, back ledge 15, front ledge 17 and top inclined ledge 19. The ledges of frame 12 are indicated as follows (see Figure 2). Base ledge 14, back ledge 16, front ledge 18 and top inclined ledge 20. Rails 21 and 22, right angle in shape (see Figure 1), are welded to top inclined ledges 19 and 20 respectively. Shelves 23 and 24, right angle in shape (see Figures 2 and 4), are spot welded to frames 11 and 12, respectively.

A bracket 25 (see Figure 4) provided with hubs 27 and 29 is secured to shelf 23 through bolt fastening means 31. Similarly, bracket 26 (see Figures 1, 2 and 8) provided with a hub 28 (shown) and a hub (not shown and which is the opposite equivalent of hub 29) is secured to shelf 24 through bolt fastening means 32. A shaft 33 secured on either end in hubs 27 and 28 holds frames 11 and 12 in spaced relation. Similarly, supports 34 and 35 welded to front ledges 17 and 18 respectively, complete the assembled framework of the machine. Caps 37 and 38 spot welded to back ledges 15 and 16 and top inclined rails 21 and 22 respectively, guard pulleys, presently to be described.

Lawn mower holding slide 40 consists of left hand and right hand rail guides 41 and 42 respectively. A trough bar 43 with an apron 44 attached, is secured to left hand rail guide 41 and right hand rail guide 42 by any well known means such as spot welding or by the use of rivets 45 and 46

Clamps consisting of C-shaped bodies 47 and 48 are adapted to receive hand screws 49 and 50 which press against rail guides 41 and 42 thereby causing the bottom of the C to grip frames 11 and 12 and hold the lawn mower holding slide 40 in any desired position on the inclined rails 21 and 22. On either side of the C-shaped bodies 47 and 48 are C-shaped fixtures 89, 91 and 90, 92 welded to rail guides 41 and 42, respectively. A dowel pin 93 passes through fixtures 89, 91 and C-shaped body 47. The dowel 93 is held tightly in fixtures 89, 91 and loosely in body 47, thereby permitting the C-shaped body to pivot when hand screw 49 is tightened or loosened. Similarly fixtures 90 and 92 are welded to rail guide 42 on either side of C-shaped body 48. A dowel 94 acting as a shaft with bearings in fixtures 90, 92 permits C-shaped body 48 loosely mounted on dowel 94 to pivot when hand screw 50 is tightened or loosened.

Inverted L-shaped brackets 51 and 52 provided with integral inverted U-shaped members 53 and 54 are welded to left hand and right hand rail guides 41 and 42, respectively. Hand screws 55 and 56 are guided in clearance holes in the forward plates 57 and 58 of U-shaped members 53 and 54. A shaft 60 provided with flattened ends 61 and 62 is adapted to receive the threaded ends of hand screws 55 and 56 as the flattened ends 61, 62 are guided by the base of L-shaped brackets 51, 52 and base plate of the U-shaped members 53 and 54. This mechanism is the adjustment for lining up the reel blade with the grinding wheel.

Mounted on shaft 60 are two clamp assemblies 63 and 64 which hold the lawn mower in place. It will be noted that the base of the lawn mower rests in trough bar 43. Assemblies 63 and 64 consists of block bearings 65 and 66. Integral with the top and bottom surfaces of block bearing 65 are saddles 67, 69 integral with the top and bottom surfaces of block bearing 66 are saddles 68 and 70. Braces 71, 72 and 73, 74 ride in top saddles 67, 68 and bottom saddles 69, 70 respectively. Braces 71 and 72 are adapted to receive the threaded portions of hand screws 75 and 76. The top surface of block bearings 65 and 66 are provided with indentations 77 and 78 adapted to receive the lower end of hand screws 75 and 76. Braces 72 and 74 are freely slidable in saddles 68 and 70 and braces 71 and 73 are freely slidable in saddles 67 and 69.

The mechanism employed for lowering and raising the lawn mower holding slide 40 consists of two cables 80 and 81 secured at their outer ends to eye bolts 83 and 84 which are secured to C-shaped fixtures 89, 90 respectively and to pulley 85 on their inner ends by the simple expedient of passing the ends of cables 80, 81 through holes, not shown, running from the guide ways 97, 98 to the side 99 of the pulley. The cable ends 80, 81 are then fastened in the usual commercial split type clamp 100.

The cable 81 secured to eye bolt 84 passes over pulley 102 in frame 12, then around pulley 104 mounted in ledge 16 of frame 12, then to pulley 106 mounted in ledge 15 of frame 11, then it passes over pulley 108 mounted in frame 15 on to groove 98 of beveled gear toothed pulley 116. Cable 80 secured to eye bolt 83 passed around pulley 108 and then to groove 97 of beveled gear toothed pulley 116.

Beveled gear toothed pulley 116 provided with beveled gear teeth and a hub 118 is rotatably mounted on a shaft 120 anchored in frame 11. A bracket 122 fastened to frame 11 by means of screws 124 or by means of welding is attached to one end of shaft 120 by means of a set screw 126. A washer 128 and a bolt 130 threaded into one end of shaft 120 prevent beveled gear toothed pulley 116 from slipping on shaft 120.

A pinion gear 131 mounted on a shaft 132 which is housed in ledge 15, remains in operable engagement at all times with beveled gear tooth pulley 116. Shaft 132 is provided with a square end adapted to removably accommodate handle 133. A ratchet pawl 134 pivotally mounted on shaft 135 which has its bearings in bracket 122, is provided with a handle 136 which is used to disengage pawl 134 from pinion gear 131.

The sharpening mechanism consists of a conventional motor 140 having an outlet plug 141 adapted to engage the conventional source of electricity. The armature shaft of the motor 140 is provided with a pulley 142 adapted to receive a belt 143 which drives abrasive wheel 144 rotatably mounted on an arm 145 which is attached by means of a bolt 146 to a block 147 mounted on the ends of shafts 150, 151 which are housed in split tubes 149 and 152 attached to brackets having pairs of ears 170 and 171.

A shaft 153 fits in bearing 29 of bracket 25 on one end and in a similar bearing in bracket 26 on the other end. Two rectangular bars 154A, 154 are provided. They have bearings 155, 156 for shaft 153. Leg 157 is fixed to one edge of bar 154A as with bolt 159 and to bracket 25 with bolt 161. Similarly bracket 158 is fixed to one edge of bar 154 as with a bolt 160 and to bracket 26 with bolt 162. A shaft 165 running parallel to shaft 153 is housed in bars 154A and 154 on either end. Shaft 153 carries the bracket having ears 170 which secure the bracket to said shaft. Shaft 165 carries the bracket having ears 171 which secure the bracket to that shaft. The shafts 153 and 165 and the brackets having ears 170 and 171 with split tubes 149 and 152 fastened thereto form a rigid mount for shafts 150 and 151 to move in to advance the grinding wheel 144 toward or away from the lawn mower reel blades. This is done (see Figure 11) by providing square threads 175 in shaft 151. A bushing 176 which has internal threads in engagement with the square threads 175 is secured to collar 177 by means of set screws 180 and 181. An annular handle 182, knurled on its outside diameter is secured to collar 177 by means of set screw 183. The operative manually turns handle 182, thereby turning collar 177 and bushing 176 to move shaft 151 back and forth. Since bracket 147 is secured to shaft 151 on the forward end while housing the grinding wheel, and since motor 140 is secured to shafts 150 and 151 by means of brackets 184 and 185 which form a part of motor plate 186 attached to the base of the motor; it will be readily seen that the motor 140 and abrasive wheel 144 move with shaft 151. Inasmuch as shaft 150 is a dummy, that is, it has no square threads or moving mechanism, it will move in split tube 149 because motor plate 186 and bracket 147 are attached to it.

Handle 182 is employed each time a lawn mower is secured to the machine for sharpening. After the first lawn mower reel blade is sharpened, it is not necessary to move the abrasive wheel completely away from the vicinity of the reel blade. Indeed, a small distance of ¼ or ½ inch is sufficient to withdraw the abrasive wheel to return it to one side of the lawn mower sharpening machine to begin the cycle of sharpening the next reel blade. To that end, a collar 189 is knurled on its outside diameter to provide a firm hand grip. Collar 189 is provided with square threads on its inside diameter. Collar 177 is provided with square threads on its outside diameter which engage the square threads in collar 189. Collar 189 is fastened by means of set screw 187 to split ring 188 which is rotatively mounted in annular embossment 190 formed in collar 177. The set screw 187 holding to split ring 188 allows collar 189 to rotate thereby sliding collar 177 hence bushing 176 and shaft 151 a micrometer adjustment amount. A split ring 191 rotatively located in an annular groove 192 in split tube 152 allows collar 177 to turn when set screwed at 193 and 194 to split ring 191. Handle 182, collar 177 and collar 189 must freely rotate while advancing. The split rings 188 and 192 permit this free rotation.

The abrasive wheel 144 is provided with the usual guard cover 200 spot welded to bar 147. Projecting along one side and extending across the face of the abrasive wheel 144 is a fixed bracket 201 secured to bar 147.

In Figures 6 and 9 there is depicted the drive for imparting the transverse movement to the motor 140. Sprockets 203 and 202 are pivotally mounted in back ledge 16 of frame 12 and in back ledge 15 of frame 11 respectively. A chain 204 embraces the sprockets 202 and 203. The ends of the chain 204 are secured to turn buckles 205 and 206 which are threaded into bracket 207 depending from the brackets having ears 170 and 171 and nuts 208 and 209 lock turn buckles 205 and 206 in adjusted position in bracket 207 so that chain 204 is under proper working tension. A handle 210 fits over the shaft holding sprocket 203 in ledge 15. Rotation of handle 210 will cause chain 204 to pull motor 144 to and fro on shafts 153 and 165, thereby reciprocating abrasive wheel 144 between frames 11 and 12.

In operation a power driven lawn mower shown in dash lines as a phantom silhouette in Figures 1, 8 and 9 is run over apron 44 so that the after following roll of the lawn mower rests in trough 43. Clamp assemblies 63 and 64 are slidably adjusted on shaft 60 so that braces 73 and 74 are placed beneath the reel blade guard of the lawn mower. Braces 71 and 72 are then slid forward in saddles 67 and 68 so that they too embrace the reel blade guard. Hand screws 75 and 76 are then tightened to clamp the reel blade guard between the braces 71, 73 and 72, 74.

Handle 133 is manually cranked (although a pulley could be substituted for the crank handle and a motor employed). Shaft 132 and pinion gear 131 will turn beveled gear toothed pulley 116 thereby taking up cables 80 and 81 attached to eye bolts 83 and 84 with the consequent lifting of the lawn-mower holding slide 40 along rails 21 and 22. Handle 133 is cranked until the lawn mower reel blade is brought into horizontal alignment with abrasive wheel 144. Ratchet pawl 134 will engage ratchet 131 and thereby prevent bevel gear 116 from turning and allowing holding slide 40 from sliding down rails 21 and 22. Hand screws 49, 50 are tightened against inclined rails 21, 22 respectively, thereby holding the lawn mower blade in position, in front of the abrasive wheel 144. Handle 210 is then turned causing abrasive wheel 144 through sprockets 202, 203 and chain 204 attached to bracket 207 to be positioned to the left hand side of the machine as viewed in Figure 8. Handle 182 on shaft 151 is turned to present abrasive wheel 144 to the reel blade. The reel blade is then turned to rest upon bracket 201. The motor 140 is started causing abrasive wheel 144 to revolve. Handle 210 is slowly cranked causing sprocket 203 to pull chain 204 and through turn buckles 205 and 206 the brackets with ears 170 and 171 hence the motor 140 and abrasive wheel 144 along shafts 153 and 165. As the abrasive wheel grinds the edge of the reel blade, collar 185 may be turned to adjust the mount of the cut. When abrasive wheel 144 reaches the side 12 of the machine, collar 185 is turned to withdraw the abrasive wheel from engagement with the reel blade. Handle 210 is cranked to bring the abrasive wheel to side 11 of the machine. The next reel blade is brought into position, collar 185 is turned to advance abrasive wheel 144 into cutting position and then the reel blade is turned so as to rest on guide 201. As abrasive wheel 144 is traversed from side 11 to side 12, guide 201 caused the reel blade to revolve and present its spiral surface to the abrasive wheel 144.

Just before the sharpening action is begun, hand screws 55 and 56 are turned to adjust shaft 60 and hence the lawn mower through clamp assemblies 63 and 64, in reality reel blades in parallel alignment with the traversing path of abrasive wheel 144.

Having shown, described and illustrated a preferred embodiment of our invention, we do not wish to limit ourselves to the exact structure shown inasmuch as mechanical structural changes can be made without departing from either the spirit or scope of the invention.

What we claim is:

1. A lawn mower sharpening machine comprising a left hand frame and a right hand frame, each frame consisting of a body having an inwardly bent edge forming an inclined plane ledge, a rail fastened to the inclined plane ledge, a first bracket fastened on one end to the right hand frame body and on the other end to the left hand frame body and in the frontal area of said bodies, a second bracket fixed to the body of the right hand frame, a third bracket fixed to the body of the left hand frame, a shaft fixed on one end to said second bracket and on its opposite end to said third bracket, a second shaft secured on one end to said second bracket and on its opposite end to said third bracket, a third shaft adjacent and parallel to said second shaft secured on one end to said second bracket and on its opposite end to said third bracket, a fourth bracket provided with frontal ears for sliding movement on said third shaft and with rear ears for sliding movement on said second shaft, a left split tube and a right split tube fixed to said fourth bracket, a square threaded shaft slidably mounted in said right hand split tube, a bushing having internal threads which engages said square threads, a first collar fastened to said bushing, a handle secured to said collar, a second collar, a split ring, said second collar secured to said split ring housed in an annular embossement in said first collar, a second split ring, said first collar being fastened to said second split ring located in an annular groove in said right hand split tube, a fourth shaft located in said left hand split tube, a block fastened to one end of said square threaded shaft and one end of said fourth shaft, a motor fastened on one side to said square threaded shaft through the split in said right hand split tube and said motor fastened on its opposite side to said fourth shaft through the split in said left hand split tube, an abrasive wheel secured to said block, a belt connecting said motor with said abrasive wheel, a first sprocket rotatively mounted in the rear of said right hand frame, a second sprocket rotatively mounted in the rear of said left hand frame, a chain connecting said first sprocket with said second sprocket the ends of said chain being fastened to said fourth bracket and a handle secured to said left hand sprocket.

2. Mechanism defined in claim 1, further characterized by a holding frame consisting of rail guards mounted for sliding movement on rails of the inclined plane ledges, united by a trough bar having an apron, inverted L brackets secured to rail guards, an integral inverted U brackets forming part of said inverted L brackets, a shaft having flattened ends located in said inverted L brackets, hand screws rotatably mounted in said inverted U brackets and threaded in said flattened ends of said shaft, clamp assemblies pivotally mounted on said shaft consisting of block bearings having saddles above and below said block bearings, braces slidably mounted in said saddles, hand screws threaded in said braces located in said top saddles and pressing against block bearings, C clamps pivotally mounted between C brackets fastened to said rail guards, hand screws located in said C clamps and eye bolts fastened to said C brackets.

3. A lawn mower sharpening machine having a common frame support which is provided with surfaces inclined to the horizontal, a lawn mower holding frame slidably mounted on said surfaces and provided with clamping means to secure said holding frame to said surfaces and an abrasive wheel having a mounting supported in said common frame for parallel movement before said lawn mower holding frame.

4. A lawn mower sharpening machine comprising oppositely disposed frames having surfaces inclined to the horizontal, means for holding said frames in spaced relation including a pair of parallel shafts, a lawn mower holding frame comprising a trough adapted to support the lower roller of the lawn mower and clamps adapted to grip the lawn mower frame, said holding frame being slidably mounted on said surfaces inclined to the horizontal, clamps on said holding frame for securing it in any position on said surfaces inclined to the horizontal, an abrasive wheel provided with a mounting slidably engaging said pair of parallel shafts and means for traversing said abrasive wheel and mounting parallel to the lawn mower cutting blades.

5. A lawn mower sharpening machine comprising oppositely disposed frames having surfaces inclined to the horizontal, means for holding said frames in spaced relation consisting of supports secured in the front end of said frames and brackets having two shafts secured therein fixed to back end of said frames, arms secured to opposite ends of one of said shafts provided with a third shaft parallel to said two shafts, a lawn mower holder slidably mounted on said surfaces inclined to the horizontal, comprising a trough adapted to support the lower section of the lawn mower and means to grip another portion of the lawn mower, clamps on said holder for securing it to said surfaces, means for sliding said holder up and down said surfaces comprising a gear train mounted in one of said frames, and cables traversing pulleys mounted in said frames said cables being secured to said holder and to one of the gears in said train, an abrasive wheel provided with a mounting slidably mounted on two of said shafts for movement longitudinally of said shafts, said abrasive wheel being provided with means for movement toward and away from said mounting.

6. A lawn mower sharpening machine comprising oppositely disposed frames having surfaces inclined to the horizontal, means for holding said frames in spaced relation including a pair of parallel shafts, a lawn mower holding frame comprising a trough adapted to support the lower section of the lawn mower and clamps adapted to grip the upper section of the lawn mower, said holding frame being slidably mounted on said surfaces, clamps on said holding frame for securing it on said surfaces, an abrasive wheel, a mounting for said abrasive wheel including a fixed bracket, said mounting slidably engaging said pair of parallel shafts and means for sliding said abrasive wheel and mounting along said parallel shafts with the abrasive wheel and said fixed bracket engaging the lawn mower cutting blades.

References Cited in the file of this patent

UNITED STATES PATENTS

| | | |
|---|---|---|
| 595,125 | Kirsten | Dec. 7, 1897 |
| 1,409,641 | Anderson | Mar. 14, 1922 |
| 1,688,068 | Beyer | Oct. 16, 1928 |
| 1,916,063 | Miller | June 27, 1933 |
| 2,187,289 | Utterback | Jan. 16, 1940 |
| 2,279,798 | Shelburne | Apr. 14, 1942 |
| 2,281,055 | Smith | Apr. 28, 1942 |
| 2,432,851 | Anderson | Dec. 16, 1947 |
| 2,493,619 | Comstock | Jan. 3, 1950 |

FOREIGN PATENTS

| | | |
|---|---|---|
| 40,551 | Germany | Sept. 6, 1887 |